United States Patent
Baca

(10) Patent No.: US 7,286,339 B2
(45) Date of Patent: Oct. 23, 2007

(54) COMBINATION SERVICE ENTRANCE APPARATUS FOR TEMPORARY AND PERMANENT USE

(76) Inventor: William C. Baca, 242 Sandoval, SW., Los Lunas, NM (US) 87031

(*) Notice: Subject to any disclaimer, the term of this patent is extended or adjusted under 35 U.S.C. 154(b) by 340 days.

(21) Appl. No.: 11/054,936

(22) Filed: Feb. 9, 2005

(65) Prior Publication Data
US 2005/0201044 A1 Sep. 15, 2005

Related U.S. Application Data

(60) Provisional application No. 60/552,159, filed on Mar. 11, 2004.

(51) Int. Cl.
H02B 1/04 (2006.01)
(52) U.S. Cl. ............. 361/643; 361/644; 361/664; 361/665; 361/667; 361/668
(58) Field of Classification Search ........... 324/156; 361/644, 664–673
See application file for complete search history.

(56) References Cited

U.S. PATENT DOCUMENTS

| | | | |
|---|---|---|---|
| 1,296,323 A * | 3/1919 | Sachs .................. 361/665 |
| 3,458,768 A | 7/1969 | Schubert | |
| 3,691,288 A * | 9/1972 | Sturdivan ................ 174/38 |
| 3,906,295 A * | 9/1975 | Tessmer ................ 361/643 |
| 4,025,825 A * | 5/1977 | Shrader ................. 361/670 |
| 4,041,358 A * | 8/1977 | Donahue et al. ........ 361/660 |
| 4,318,156 A | 3/1982 | Gallagher | |
| 4,327,396 A * | 4/1982 | Schacht ................. 361/676 |
| 4,359,645 A * | 11/1982 | Schacht et al. ........ 307/113 |
| 5,212,623 A | 5/1993 | Wilson et al. | |
| 5,404,266 A * | 4/1995 | Orchard et al. ........ 361/667 |
| 5,418,683 A | 5/1995 | Orchard et al. | |
| 5,544,003 A | 8/1996 | Vaughan | |
| 5,638,256 A | 6/1997 | Leach et al. | |
| 5,663,525 A | 9/1997 | Newman | |
| 5,726,507 A | 3/1998 | Tipton | |
| 5,838,078 A | 11/1998 | Tipton | |
| 5,905,630 A | 5/1999 | Wetterling | |
| 6,252,764 B1 | 6/2001 | Benson | |
| 6,421,229 B1 | 7/2002 | Campbell et al. | |
| 6,999,305 B1 * | 2/2006 | Calcote ................. 361/601 |

* cited by examiner

*Primary Examiner*—Gregory D Thompson
(74) *Attorney, Agent, or Firm*—Dennis F. Armijo

(57) ABSTRACT

An underground combination service entrance apparatus for temporary and permanent service comprising two enclosures. A utility enclosure contains a meter socket and the second enclosure contains a breaker panel. The breaker panel on the customer side and the meter on the utility side meet NEC requirements and the local utility company regulations. An optional section in the utility enclosure provides a raceway space for routing wiring. Knockout holes are provided on the utility enclosure for installation of a hub for running wires to and from the service apparatus. The enclosures can be semi-flushed mounted. The two enclosures are isolated from each other, fastened together, and mounted on a wall. A removable hood is provided to weatherproof the customer enclosure for temporary use.

14 Claims, 6 Drawing Sheets

COMBINATION SERVICE ENTRANCE APPARATUS FOR TEMPORARY AND PERMANENT USE

CROSS-REFERENCE TO RELATED APPLICATIONS

This application is based on U.S. Provisional Application Ser. No. 60/552,159 entitled "Combination Service Entrance Apparatus For Temporary and Permanent Use", filed on Mar. 11, 2004, the teachings of which are incorporated herein by reference.

BACKGROUND OF THE INVENTION

1. Field of the Invention (Technical Field)

The present invention relates to an electrical power distribution apparatus, and more specifically, to an underground combination service entrance device that is installed for both temporary use and easily converted, if necessary, for permanent use. The term "combination" refers to the fact that the unit encloses both the mounting provisions for a utility-company watt-hour meter and a load center or panel board containing circuit breakers for distribution, control and protection of various circuits in a building.

2. Background Art

In the typical construction of a building, contractors or builders will install temporary power to operate various tools and machinery. The temporary power service will typically include a watt-hour meter to measure power consumption for billing by the utility company, a service disconnect, branch circuit protection, and outlet receptacles for attaching temporary power to one or more extension cords. After construction has progressed to a certain point, permanent service is connected to the building and the temporary devices are removed. This setting of temporary power service results in the undesirable added expense, scheduling time to both the utility company and the builder.

Utility companies require that the utility meter section of any combination service entrance be separated and sealed from the "customer's" side, i.e., the circuit breakers. Normally, in order to provide access to the meter by the utility companies, the combination service entrance devices are installed on the outside of the building. Builders have found that many building owners prefer to access the "customer" side from the interior of the building. There is a need for a combination service entrance to meet the needs of a utility company's outside access and the end consumers interior access. In addition, the design of the system must meet codes and standards set by local governments, and utilities that are usually more restrictive than the national minimum standard. The current art in this area does not meet market requirements, where the codes and the standards of the utility company are restrictive, resulting in higher costs to the builder and ultimately the consumer.

Many local governments allow individuals or end users to perform "craft" installations or modifications for combination service entrance devices due to the lack of these units in the marketplace. These "craft" installations may and usually do not meet the several code requirements by the various enforcement authorities.

There is a need for a combination service entrance system that uses existing components while complying with all regulations. Existing combination service entrance devices, as assembled by their manufacturers, when installed, do not meet accessibility restrictions of the National Electrical Code (NEC), and utility companies. A prior art device that is typical is U.S. Pat. No. 5,638,256 to Leach, et al. This device is an overhead/underground combination service entrance device having a single or unitary enclosure divided by a center barrier, thus creating a separate utility section and a customer section. This device has several deficiencies that are overcome in the present invention. The present invention has a service disconnect on the meter side and one on the panel board or customer side. Secondly, a critical requirement is not met by the Leach, et al., patent. The maximum elevation of the circuit breakers on the customer side are set by the National Electrical Code while the minimum elevation of the meter (and thus the meter socket) is set by the local utility companies. With the unitary design of the enclosure for both the utility side enclosure and the customer side, these specifications cannot be met. Either the breaker exceed the maximum height or the meter is below the minimum height. The present invention can be mounted with the outside portion flush mounted, semi-flush mounted, and the inside portion flush with the interior walls.

SUMMARY OF THE INVENTION (DISCLOSURE OF THE INVENTION)

Disclosed is a combination temporary and permanent service for providing power to construction sites and buildings. The service comprises a customer enclosure stacked on top of a utility enclosure and is configured to meet the height requirements for circuit breakers as well as the height requirement for the utility meter. Also disclosed is an apparatus and method for weatherproofing the customer enclosure for temporary use.

A primary object of the present invention is to provide a universal combination service apparatus that meets all codes and requirements.

Another object of the present invention is to provide a temporary service apparatus that is easily converted to a permanent service apparatus.

A primary advantage of the present invention is that the present invention can be converted form a temporary installation to a permanent installation with minimal modification.

Another advantage of the present invention is reduced costs and time for installing temporary power and permanent power to a building.

Yet another advantage of the present invention is that it meets accessibility restrictions of the utility side and customer side and meets the standards and code restrictions.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The presently invented combination service was designed for a temporary and permanent service for new construction. Using the prior art temporary service connections, several builders have been fined by OSHA or other regulatory agencies for unsafe practices for the use of their temporary pole service. They were missing wires, bare wires, were missing covers and the like. To obviate the problem, the applicant designed a panel that would be a temporary/permanent service type application and meet the regulatory agency's requirements. There are no available factory made service entrances that meet the State or NEC codes, thus the need for the present invention. Additionally, the prior art combination services were not adaptable to be reconfigured to meet the differing utility company requirements for meter height and the standard NEC height for the circuit breakers.

Figure 1:
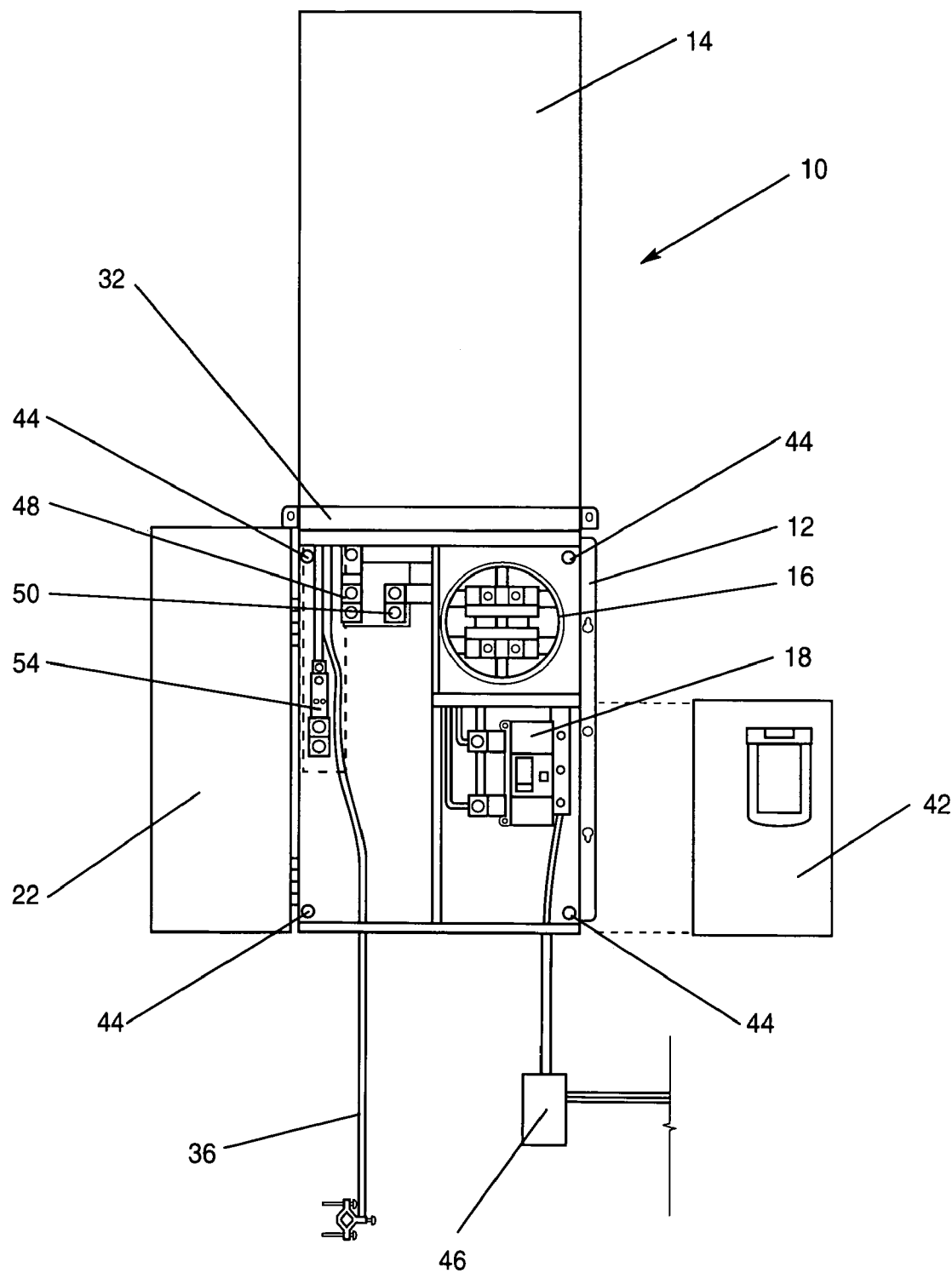
FIG. 1 is a front view of the invention showing the uncovered utility enclosure.
Figure 2:
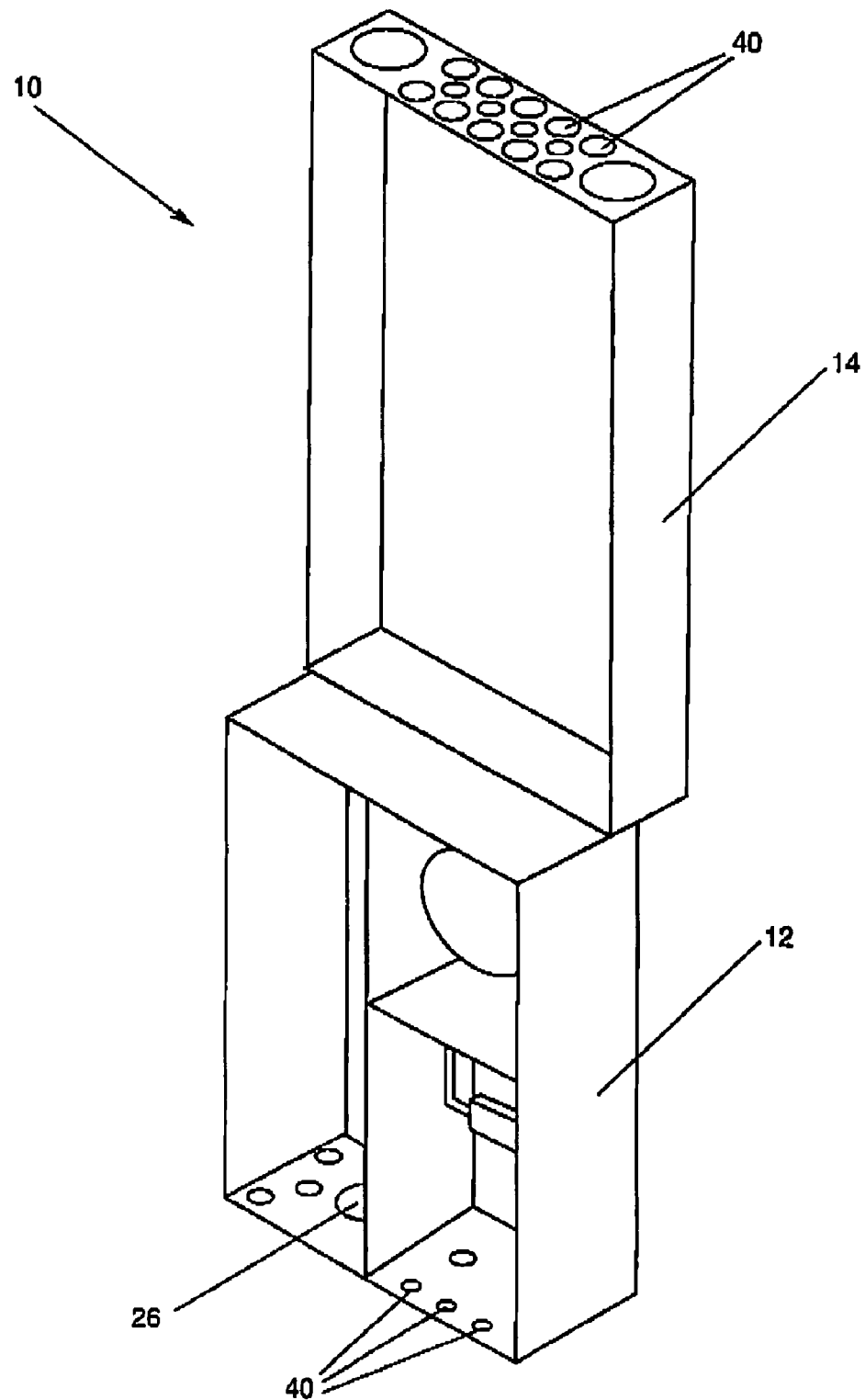
FIG. 2 is a perspective view of FIG. 1.

The preferred embodiment of the present invention showing the uncovered utility enclosure 12 is shown in FIG. 1. The preferred combination service entrance 10 comprises a utility enclosure 12 and a customer enclosure 14. In the preferred embodiment, customer enclosure 14 is stacked or mounted on top of utility enclosure 12 as shown. Due to the configuration of the combination service 10, a partition 32 is created to isolate the utility enclosure 12 from the customer enclosure 14. Utility enclosure 12 faces the outside of the building for access by the utility companies for reading meters and the like. Utility enclosure 12 includes a grounding cable 36 which is connected to a grounding structure which will be discussed below. Grounding cable 36 is affixed to a grounding bar 100 located in customer enclosure 14. Outside power is run into the utility enclosure 12 via power knockout 26 and the power carrying wires are connected to utility ground 54 utility line 1 lug 48 and utility line 2 lug 50, as is well know in the art. Incoming power is then transferred to the meter socket 16 as shown. A meter (not shown) is attached to the meter socket 16 by the power company to deliver power to the combination service entrance 10. A power disconnect 18 is preferably mounted and accessed on the utility enclosure 12 as shown, but could alternatively be mounted and accessed on the customer enclosure 14. In the preferred embodiment a power or service disconnect is provided in both the customer enclosure 14 and the utility enclosure 12. For temporary use a Ground Fault Interrupter (GFI) power outlet 46 is hooked to power disconnect 18 and provides power for use during construction. Once a permanent installation is complete as described below, GFI power outlet 46 is removed. As shown in FIG. 2, knockouts 40 are also provided as shown for routing wires to and from utility enclosure 12 as well as customer enclosure 14. Power knockout 26 provides access for power company cables. Referring back to FIG. 1, utility door 22 covers the front of utility enclosure 12. An additional power disconnect door 42 may be provided to access power disconnect 18. Mounting apertures 44 can also be included for mounting utility enclosure 12 to a wall, or the like.

Figure 3A:
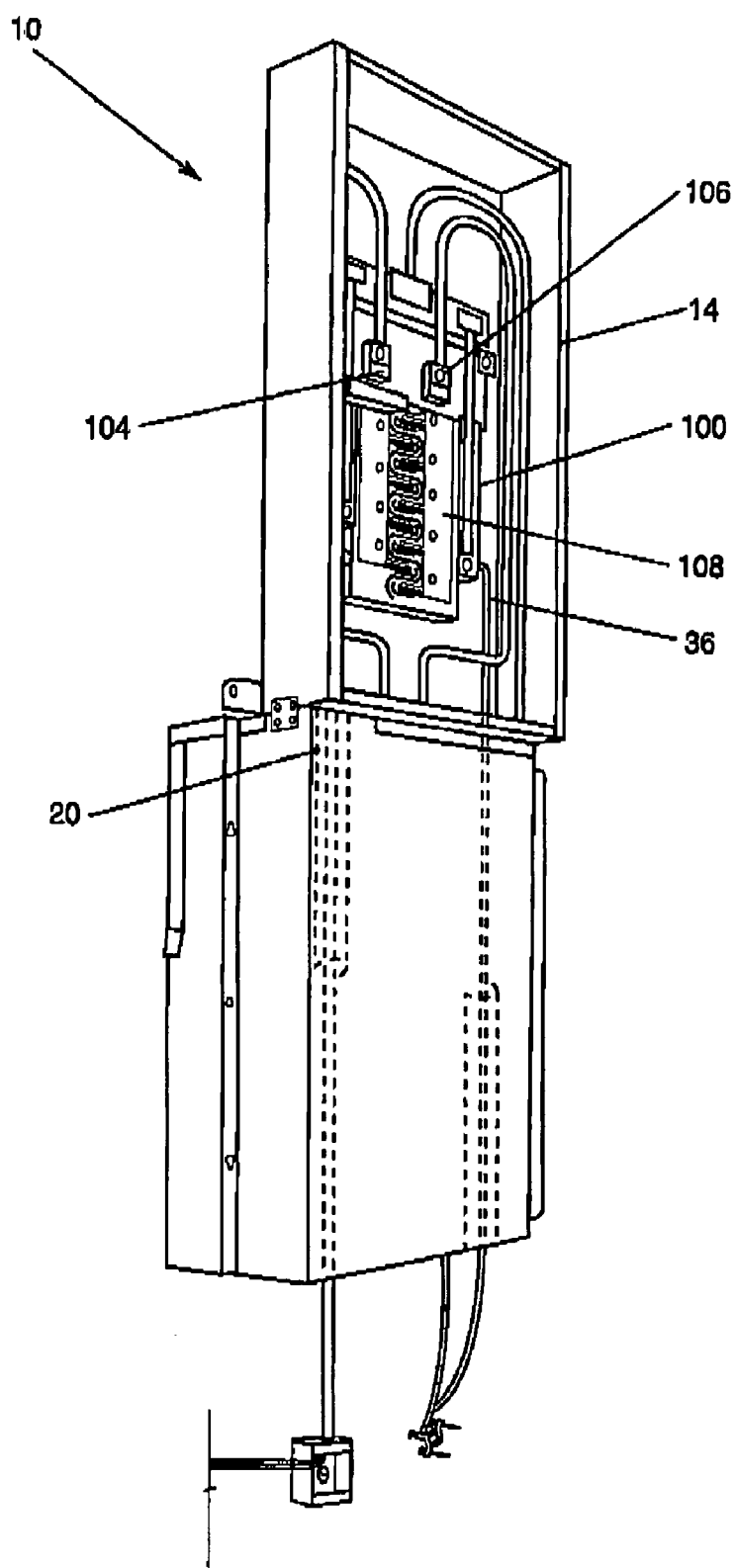
FIG. 3A is a rear view of the invention showing the uncovered customer enclosure.

The preferred embodiment also includes a customer enclosure 14, which faces the interior of a building for access by the customer or end user as is shown in FIG. 3A. Within the customer enclosure 14 is a grounding bar 100 for connecting the ground cable 36. The power cables 106 come from utility raceway 20 of utility enclosure 12 to customer enclosure 14 as shown. Power cables 106 are hooked to customer line 1 lug 104 and customer line 2 lug 106 as shown which in turn supplies power to the circuit breaker board or breaker panel 108. Circuit breakers are then installed (not shown) as well known in the art.

Figure 4A:
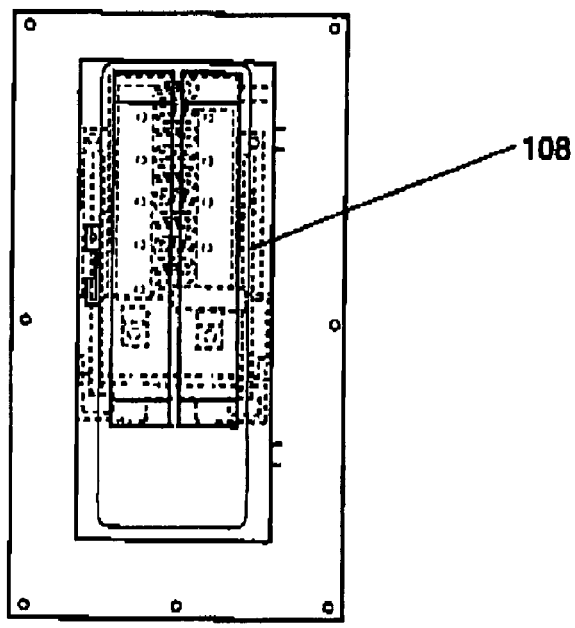
FIG. 4A shows a prior art Square D® standard enclosure.
Figure 4B:
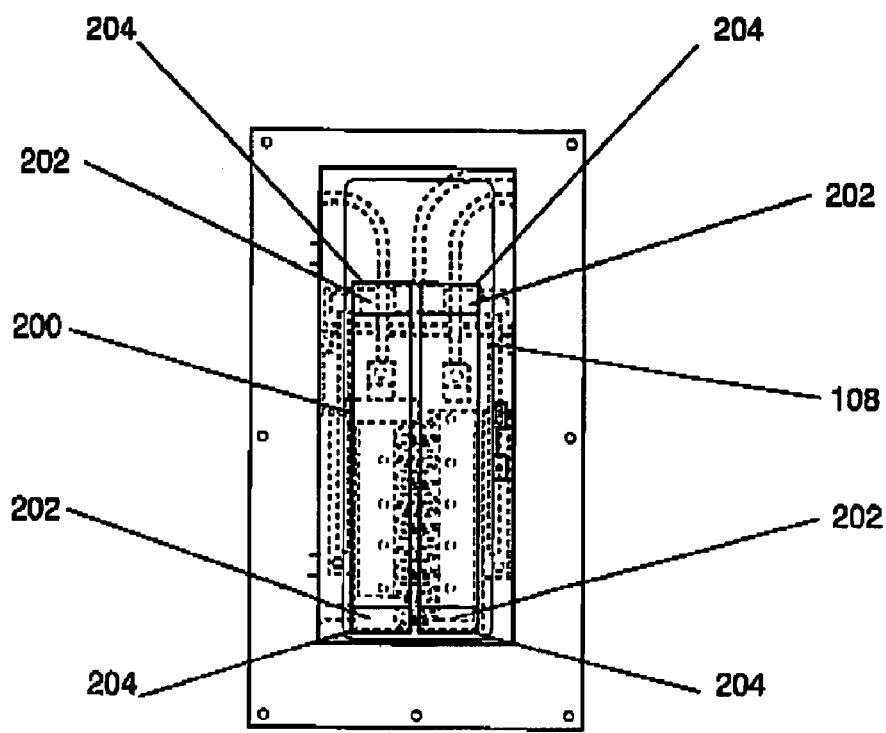
FIG. 4B shows preferred method of locating the breaker panel in the standard prior art enclosure of FIG. 4A.

As previously discussed, the meter maximum and minimum meter height is specified by the utility companies as is typically five foot (5') minimum height and six foot (6') maximum height above the ground surface. The standard height requirement for the circuit breakers is a maximum of six foot seven inches (6'7") as per NEC regulations. Thus in meeting these requirements, standard or available enclosures cannot be used in a stacked configuration. Available breaker panels are too long, do not contain enough breaker spaces and exceed the maximum NEC height requirements when used in a stacked configuration. In order to meet these standards, the present invention uses a conventional utility enclosure and a custom made or designed customer enclosure. Referring again to FIG. 3A, a customer enclosure 14 manufactured by Square D®, model 2040 L200 is used. FIG. 4A shows the Square D® standard customer enclosure. For the present invention, as shown in FIG. 4B, all of the factory installed interior is removed, including the wires and the breaker panel 108. As shown in FIG. 4B, breaker panel 108 is turned upside down and located in the customer enclosure 14 using a template 200 comprising a panel cover or the like with four corner slots 202 with temporary locating breakers 204 installed in the four corner slots 202 of the breaker panel 108. In this manner breaker panel 108 can be aligned in the proper position in the customer enclosure 14, marked and attached to the customer enclosure 14 using 8-32 screws, or the like (not shown). By using this technique in positioning the breaker panel 108, the maximum breaker height B and meter height A of FIG. 5 can be met. Although this method is described for modifying existing enclosures, custom enclosures can be manufactured to meet the required standards.

Referring back to FIG. 3A, once breaker panel 108 is in position, a new feeder or power cable 106 wire is routed and installed, as shown. After installation of breaker panel 108, the panel cover 206 is installed. For the retrofit as described, the slots 208 of the breakers won't fit with the cover placed as originally designed, thus the original panel cover 108 can be reversed and the breakers then fit the slots in the panel cover 108. For permanent use, utility raceway 20 is used for routing wiring to customer enclosure 14 as shown. New labels (not shown) can be affixed to the breaker panel cover 108. In the alternative, customer enclosure 14 can be manufactured specifically for the stacked configuration by designing the customer enclosure to meet the NEC height requirement for the breakers when used as described. Using this reconfiguration a stackable service entrance is provided that meets all NEC and utility codes.

Figure 3B:
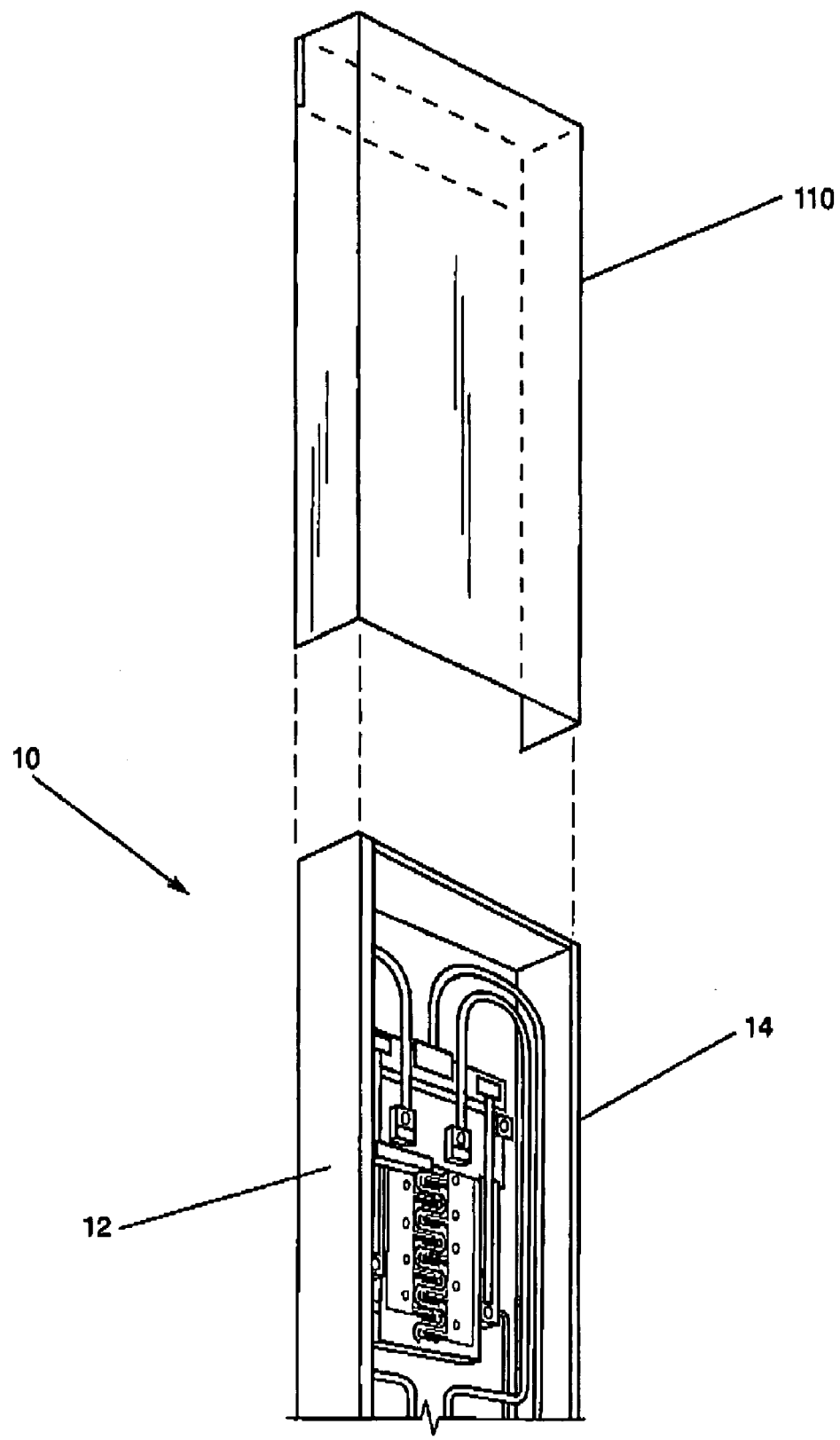
FIG. 3B shows the preferred hood.

In order to meet the miss and regulations of the NEC and the utility companies for a temporary installation, the enclosures must be sufficiently weatherproofed to keep moisture from entering the enclosures. Preferably a hood 110 can be placed over the customer enclosure that deflects rain or snow and keeps it from entering the enclosure as shown in FIG. 3B. For convenience, the hood can include a hinged door that can be raised to allow access to the panel cover door or the entire hood can be removably secured in place. Hood 110 is preferably removed for a permanent installation.

Figure 5:
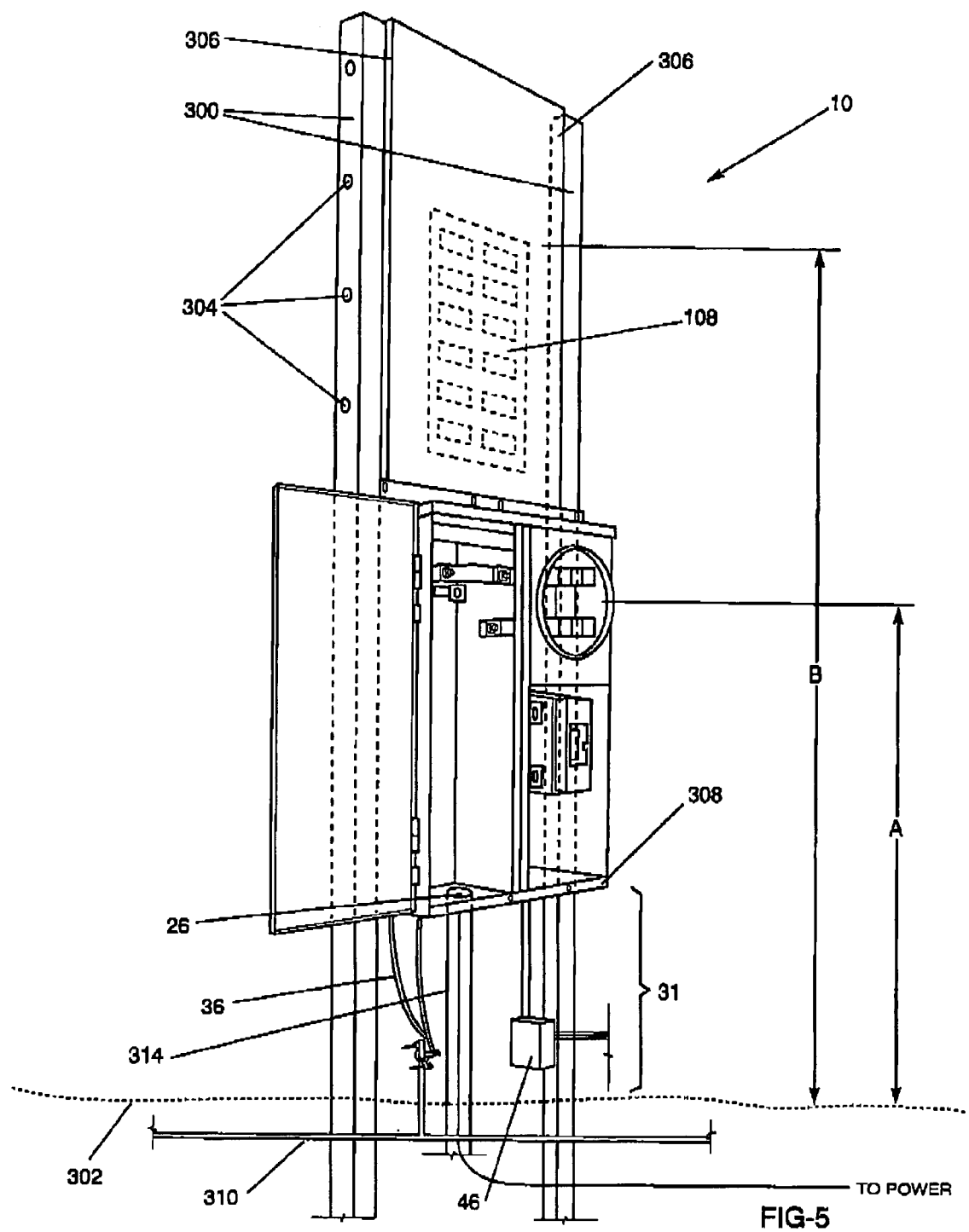
FIG. 5 is a perspective view of the preferred invention installed as a temporary and permanent service.

FIG. 5 shows a typical field installation for temporary service. Although the best mode of installing the temporary service is explained below, other similar well known installation techniques can be used. A location for the temporary service and permanent service (combination service) 10 is chosen. For the preferred installation, two metal two by fours (2"×4") 300 are buried at least three feet (3') into the ground surface 302 where the footing for the building is located. The metal two by fours 300 are attached by bolts 304 or the like, to the sides 306 of the service entrance. The bottom 308 of the service entrance is above the ground 302 typically about three feet (3'). The ground cable 36 is attached to a ufer ground 310, a riser from the rebar in the foundation and can also be attached to a copper grounding rod buried into the ground and attached to grounding bar 100. If necessary the combination service entrance 10 can be braced in methods well known in the art (not shown). A two inch (2") or 2 and one half inch (2½") PVC schedule 80 pipe 314 is attached to a power in knock out 26 to encase the utility power cables into the combination service entrance 10. The temporary service through the GFI power outlet 46 is then ready for use once power is installed by the utility company. When the footing cement is poured, the combination service entrance 10 and the supporting two by fours 300 that are set into the footing are permanently attached. Some adjustment may be needed to assure that the combination service entrance 10 is plumb. The combination service entrance 10 is therefore permanent and stays in place for the duration of the construction and also for permanent installation as part of the building.

Once the temporary power is no longer necessary and permanent power is required, the GFI power outlet 46 is removed and breakers are installed into the breaker panel 108. The service entrance can be flush mounted or semi-flush mounted depending on the desires of the construction design and the placement of the combination service entrance 10.

The present invention uses different components for providing temporary power in a service entrance and the permanent service entrance. However, the temporary component group is easily convertible to the permanent component group with minimal additional parts and with a minimum of disposed parts. This results in a reduction of costs and time spent in the initial installation of the temporary service and the conversion to a permanent service. Thus, a totally different temporary service pole and service box is not needed, and the undesirable expense of requesting the utility company to connect power and the builder to provide a multiple number of service boxes is obviated. The invention can be used for residential and commercial building construction.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A combination electric power distribution service entrance apparatus for temporary use and permanent use, the apparatus comprising:
   a utility enclosure and a customer enclosure wherein said customer enclosure is stacked on top of said utility enclosure;
   a partition to isolate said utility enclosure from said customer enclosure;
   a meter socket disposed on said utility enclosure at a predetermined first height from a ground surface; wherein the meter socket faces a first direction; and
   a circuit breaker panel disposed on said customer enclosure at a second predetermined height from the ground surface; wherein the circuit breaker panel faces a second direction opposite of the first direction.

2. The invention of claim 1 wherein said predetermined height comprises a minimum of five feet and a maximum of six feet from the ground surface.

3. The invention of claim 1 wherein said second predetermined height comprises a maximum of six feet seven inches from the ground surface.

4. The invention of claim 1 further comprising a removable ground fault interrupter power outlet for the temporary use.

5. The invention of claim 1 further comprising a removable hood for weatherproofing said customer enclosure of the combination electric power distribution service entrance apparatus.

6. The invention of claim 1 further comprising a mounting structure for said combination electric power distribution service entrance.

7. The invention of claim 6 wherein said mounting structure comprises poles buried in the ground surface at a location of a building footing.

8. The invention of claim 1 further comprising a first service disconnect in said customer enclosure and a second service disconnect in said utility enclosure.

9. A method for providing a combination temporary and permanent electric power service to a location, the method comprising the steps of:
   a) providing a combination electric power distribution service entrance apparatus as described in claim 1;
   b) installing the combination electric power distribution service entrance at the location;
   c) providing temporary power to the combination electric power distribution service entrance;
   d) pouring a footing of a building over a mounting structure for the combination electric power distribution service entrance; and
   e) removing the temporary power and hooking up permanent power to the combination electric power distribution service entrance.

10. The method of claim 8 wherein the step of installing comprises installing the combination electric power distribution service entrance to comport with a minimum and maximum meter socket height and a maximum circuit breaker panel height from a ground surface.

11. The method of claim 10 wherein the minimum meter socket height is five feet, the maximum meter socket height is six feet and the maximum circuit breaker panel height is six feet seven inches from the ground surface.

12. The method of claim 9 wherein the step of providing temporary power comprises installing a removable ground fault interrupter power outlet.

13. The method of claim 9 wherein the step of providing temporary power comprises weatherproofing the combination electric power distribution service entrance.

14. The method of claim 9 further comprising the step of providing a first service disconnect on the customer enclosure and providing a second service disconnect on the utility enclosure.

* * * * *